UNITED STATES PATENT OFFICE.

ANN E. WRIGHT, OF HAMLIN, NEW YORK.

IMPROVEMENT IN REMEDIES FOR WORMS.

Specification forming part of Letters Patent No. 115,407, dated May 30, 1871; antedated May 22, 1871.

I, ANN E. WRIGHT, of Hamlin, in the county of Monroe and State of New York, have invented a certain Remedy for Worms, of which the following is a specification:

My invention relates to a mixture formed principally by an alcoholic infusion of certain drugs and herbs well known in the *materia medica,* which gives immediate relief in cases of worms in the system and fits produced by worms, and which in itself is wholly innocuous when taken in proper quantities.

I use in the preparation of my specific the following articles: Leaves of the aloe, (*A. Barbadensis* or *socotrina,*) the leaves of the common saffron, (*crocus sativus,*) leaves of the herb wormwood, (*artemisia absinthium,*) and those of the common sage-plant, (*salvia officinalis,*) to which is added anise-seed, (*pimpinella anisium,*) as an aromatic and flavoring ingredient.

The above are placed in a mixture of equal parts of whisky and sugar-house sirup, and allowed to stand considerable time, preferably two or three days, till the medical properties of the herbs are well infused into the liquor. The resulting product is strained and is then ready for use.

In practice I find the following proportions to be suitable for the preparation: For one pint of mixture, one ounce of aloes, one ounce of saffron, one ounce of leaves of wormwood, one ounce of sage-leaves, one-half ounce of anise-seed, to one-half pint of whisky or reduced alcohol, and one-half pint sugar-house sirup.

My remedy has never failed to afford relief in the most extreme cases of worm-fits and other difficulties caused by the presence of worms in the system.

What I claim as my invention is—

The worm-mixture, composed of the ingredients herein set forth.

ANN E. WRIGHT.

Witnesses:
F. H. CLEMENT,
D. W. WRIGHT.